United States Patent [19]

Chaoui et al.

[11] Patent Number: 4,747,657
[45] Date of Patent: May 31, 1988

[54] ACHIEVING IMPROVED RADIAL ALIGNMENT IN AN OPTICAL PACKAGE

[75] Inventors: Ghazi M. Chaoui; Charles R. Fegley, both of Muhlenberg Township, Berks County; Jan Lipson, Upper Macungie Township, Lehigh County; Ralph S. Moyer, Cumru Township, Berks County; Thomas S. Stakelon, South Whitehall Township, Lehigh County, all of Pa.

[73] Assignees: American Telephone and Telegraph Company, Murray Hill; AT&T Technologies, Inc., Berkeley Heights, both of N.J.

[21] Appl. No.: 61,629

[22] Filed: Jun. 15, 1987

[51] Int. Cl.[4] .............................................. G02B 6/42
[52] U.S. Cl. ........................ 350/96.20; 219/121 LC; 350/96.18; 350/320
[58] Field of Search .................. 250/227; 350/96.10, 350/96.15, 96.16, 96.17, 96.18, 96.20, 96.21, 320; 357/17, 19, 74-81; 219/121 LC, 121 LD

[56] References Cited

U.S. PATENT DOCUMENTS

| | | | |
|---|---|---|---|
| 4,119,363 | 10/1978 | Camlibel et al. | 350/96.20 |
| 4,144,504 | 3/1979 | Leggett et al. | 331/94.5 P |
| 4,296,998 | 10/1981 | Dufft | 350/96.20 |
| 4,523,802 | 6/1985 | Sakaguchi et al. | 350/96.12 |
| 4,623,220 | 11/1986 | Grabbe et al. | 350/96.20 |
| 4,647,331 | 3/1987 | Koury, Jr. et al. | 350/96.15 X |
| 4,673,244 | 6/1987 | Miles | 350/96.20 |
| 4,677,290 | 6/1987 | Mitch | 250/227 |
| 4,679,908 | 7/1987 | Goodwin | 350/96.20 X |
| 4,701,013 | 10/1987 | Jurczyszyn et al. | 350/96.20 |
| 4,714,315 | 12/1987 | Krause | 350/96.20 |

FOREIGN PATENT DOCUMENTS 2124402A 2/1984 United Kingdom .

*Primary Examiner*—John Lee
*Attorney, Agent, or Firm*—Wendy W. Koba

[57] ABSTRACT

A method of achieving radial (x,y) alignment between an active device subassembly and an optical fiber subassembly of an optical package is disclosed. The method relies on the use of mating sections with essentially identical outer diameters. The subassemblies are brought into contact and are first joined at the two points where the edges of the piece parts coincide (flush points). It has been determined that by continuing the attachment process at symmetric locations about one of the flush points, minimal disturbance of throughput efficiency will be maintained. The optical throughput is continually monitored to determined at which particular flush point the attachment process should proceed. In particular, as soon as the throughput efficiency drops below a predetermined value, the attachment process is rotated to continue at the opposite flush point.

11 Claims, 4 Drawing Sheets

FIG. 6

| WELD SEQUENCE (WC) | WELD LOCATION (POS. DEGREES) | COUPLING POWER (CP, mW) | |
|---|---|---|---|
| 0 | (PRE-WELD CONDITION) | 1.60 | |
| 1 | FP1 – 175° | 1.61 | |
| 2 | FP2 – 355° | 1.615 | |
| 3 | 185 | 1.62 | |
| 4 | 165 | 1.615 | @ FP1 |
| 5 | 195 | 1.62 | |
| 6 | 155 | 1.58 | |
| 7 | 205 | 1.45 | |
| 8 | 145 | 1.42 | |
| 9 | 5 | 1.61 | |
| 10 | 345 | 1.61 | |
| 11 | 15 | 1.615 | |
| 12 | 335 | 1.615 | @ FP2 |
| 13 | 25 | 1.61 | |
| 14 | 325 | 1.60 | |
| 15 | 35 | 1.55 | |
| 16 | 315 | 1.50 | |
| 17 | 215 | 1.63 | |
| 18 | 135 | 1.635 | |
| 19 | 225 | 1.64 | |
| 20 | 125 | 1.645 | |
| 21 | 235 | 1.645 | |
| 22 | 115 | 1.65 | |
| 23 | 245 | 1.65 | |
| 24 | 105 | 1.65 | |
| 25 | 255 | 1.66 | |
| 26 | 95 | 1.66 | @ FP1 |
| 27 | 265 | 1.66 | |
| 28 | 85 | 1.66 | |
| 29 | 275 | 1.66 | |
| 30 | 75 | 1.66 | |
| 31 | 285 | 1.66 | |
| 32 | 65 | 1.66 | |
| 33 | 295 | 1.66 | |
| 34 | 55 | 1.66 | |
| 35 | 305 | 1.66 | |
| 36 | 45 | 1.66 | |

ACHIEVING IMPROVED RADIAL ALIGNMENT IN AN OPTICAL PACKAGE

BACKGROUND OF THE INVENTION

The present invention relates to an optical package with an improved fiber-to-optical device radial alignment, more particularly, to a systematic method of radially aligning a fiber subassembly to the package housing the optical subassembly.

An important factor in the reliability of optical transmission systems is the stability of the various components—transmitters, repeaters, and receivers. The packages housing these components have been the subject of much study, especially the aspect of attaching and aligning the optical fiber to the active component (laser, LED, photodiode, etc.) contained in the package. The stability of these alignments over long periods of time is one of the most important components of the over-all system reliability.

An exemplary prior art optical package is disclosed in U.S. Pat. No. 4,119,363 issued to I. Camlibel et al on Oct. 10, 1978. In the Camlibel et al arrangement, the optical fiber is inserted in the package through an epoxy-filled tube. Upon solidifying, the epoxy fixes the position of the fiber relative to the tube. To achieve alignment between the fiber and the optical device, the tube is manipulated until maximum optical output is attained. The tube is then soldered into place by heating the entire package. An alternative package arrangement is disclosed in U.S. Pat. No. 4,623,220 issued to D. Grabbe et al on Nov. 18, 1986. Grabbe et al use a fiber alignment pedestal which is located inside the package next to the optical device. The fiber is fed through an epoxy-filled opening in the head of the pedestal and positioned axially to obtain maximum output. The epoxy is then cured to fix this axial alignment. The pedestal itself is located in an epoxy-filled well and is moved vertically and horizontally to maximize output. The epoxy is then cured in the well to maintain the pedestal in place. A problem with both of these arrangements is that the type of epoxy, solder, or other holding material used to fix the alignment must be carefully controlled; for example, materials with different melting temperatures must be used for the two separate alignments of Grabbe et al, so that the fiber and optical device will remain aligned during any further package processing.

As an alternative, U.K. Pat. No. 2,124,402A issued to B. A. Eales et al on Feb. 15, 1984 uses laser welding in place of epoxy or solder to fix the fiber in place. In particular, the optical fiber is encased in a metal tube and positioned on a heat sink next to the optical device. A metal clamp is placed over the fiber to hold it in position and is laser welded to both the heat sink and the metal cover around the fiber. Altough the laser welds are more stable than the other forms of attachment previously discussed, the need to perform these laser welds inside the package and within close proximity of the active device may be troublesome.

SUMMARY OF THE INVENTION

The present invention relates to an optical package with an improved fiber-to-optical device radial alignment and, more particularly, to a systematic method for mating and aligning a fiber subassembly to the package housing the optical subassembly.

The method relies on the use of cylindrical mating pieces for the optical subassembly and the fiber subassembly, the fiber subassembly being known in the art as a fiber ferrule. In order to use the method of the invention, the mating pieces should comprise essentially identical outer diameters.

Our inventive method consists of utilizing a series of systematically applied laser welds, beginning at one of two points where the edges of the subassemblies coincide (flush points). A series of laser welds are applied about one of these flush points until the monitored light ouput through the fiber drops below a predetermined threshold level. Should the light output fall below this threshold, the laser welding operation is continued at the remaining flush point. Again, the light output is monitored, and if it drops below threshold once more, the apparatus is rotated back into its original position to continue the welding operation. These monitoring and rotating operations will continue until the entire number of welds have been completed. It was discovered that this welding process will always result in the optimal radial alignment of the fiber subassembly to the device subassembly.

An advantage of the present invention is that it may be completely automated, as will be described in detail hereinafter, thus dramatically decreasing the time it takes to perform this alignment.

Another advantage of this method is that a large number of laser welds, for example, 36, may be used to fix the fiber assembly to the package, thus improving the stability of the final optical package.

Other and further advantages of the present invention will become apparent during the course of the following discussion and by reference to the accompanying drawings.

BRIEF DESCRIPTION OF THE DRAWING

Referring now to the drawings, where like numerals represent like parts in several views:

FIG. 6 is a table representative of the data recorded during an exemplary alignment and attachment operation.

DETAILED DESCRIPTION

Figure 1:
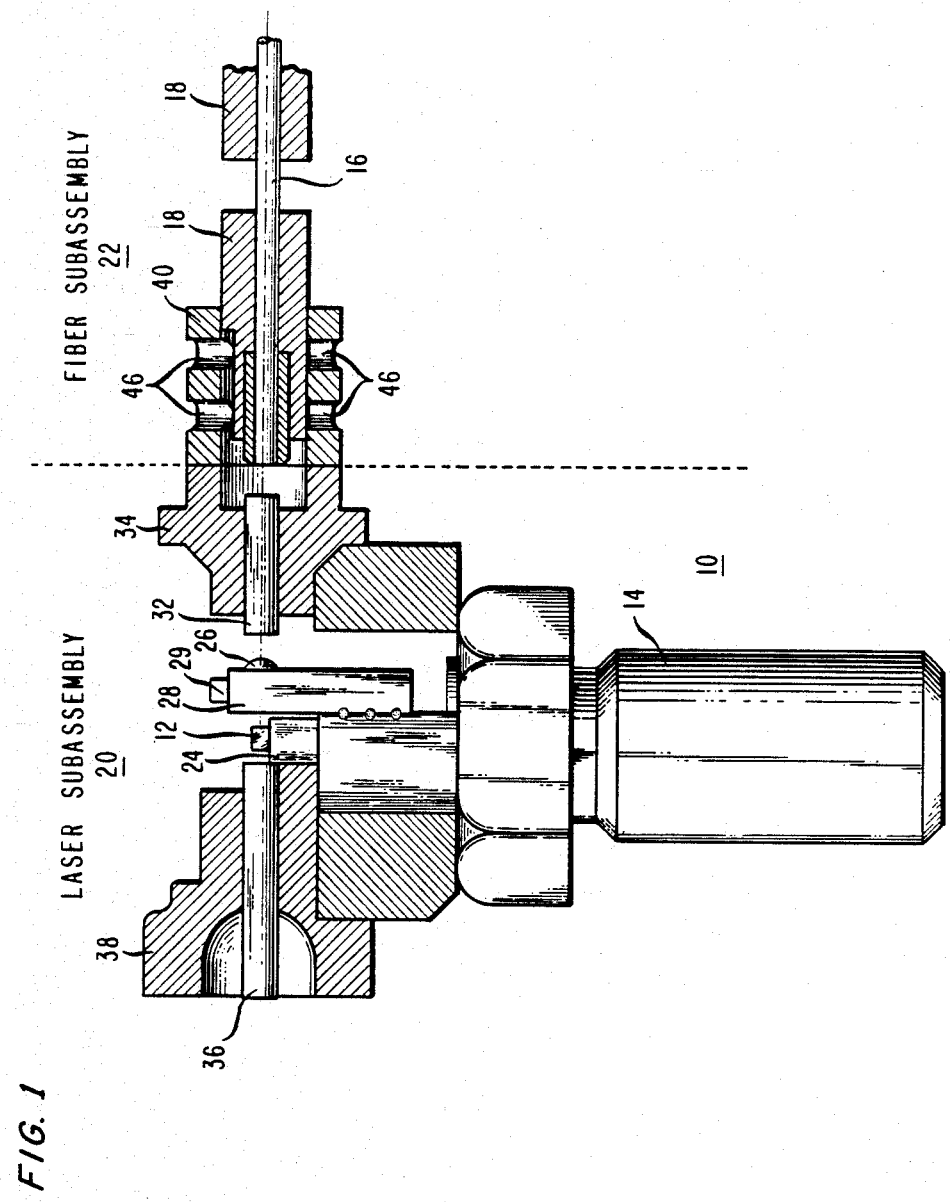
FIG. 1 illustrates a cross-sectional view of an exemplary laser package formed in accordance with the present invention.

FIG. 1 shows a completed package 10 with a laser 12 mounted on a stud 14 and an optical fiber 16 feeding through a ferrule 18 and aligned with laser 12. The package can be considered as comprising two separate subassemblies; a laser subassembly 20 and a fiber subassembly 22. The focus of this invention is primarily related to the radial (x, y) alignment of these two subassemblies, since the alignment of the two is often critical to the reliability of the final package.

Figure 2:
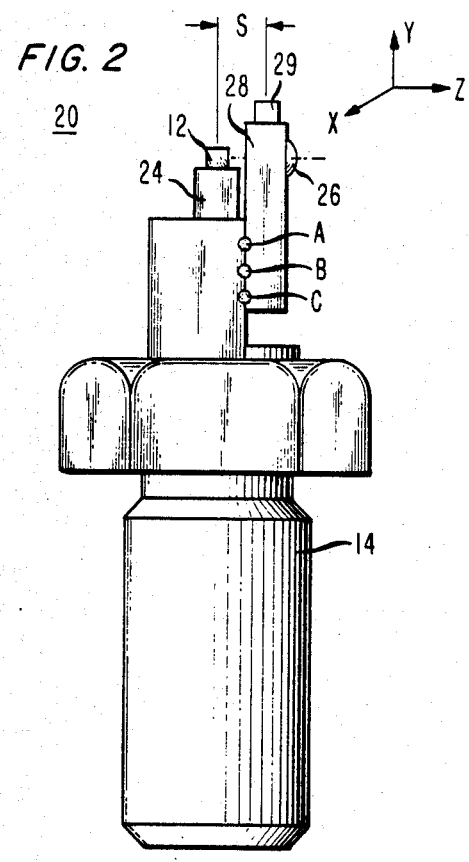
FIG. 2 illustrates an exemplary laser subassembly which may be used in conjunction with the package of FIG. 1.

FIG. 2 illustrates in detail an exemplary laser subassembly 20. Laser 12 is attached to a mount 24 which is part of stud 14. Since the output from a laser is a divergent beam with a divergent angle in the range of, for example, 10° to 50°, a collimating lens 26 is positioned near the exit port of laser 12. As shown in FIG. 2, lens 26 is placed in an opening in a platform 28 using a retaining spring 29. Lens 26 is then positioned in the x-direction (indicated in the figure) until the required spacing S betweeen laser 12 and lens 26 is achieved. In most cases, this spacing should be in the range of 10–20 $\mu$m. Active alignment is then performed to position the axis of lens 26 relative to the output from laser 12. In one active alignment procedure, a video system is used where the optical axis of the lens is first aligned with a fiduciary on a video screen. Laser 12 is then activated and the emission through lens 26 is viewed on the screen at a relatively far distance (>150 mm). The position of platform 28 is then adjusted until the emission aligns with the fiducial marking. Once alignment is achieved, platform 28 is attached to mount section 24 of stud 14. In order to achieve high reliability and insure that the relative positions of laser 12 and lens 26 remain constant, a series of laser welds are used to attach platform 28 to mount 24. Three such laser welds are illustrated in FIG. 2. A similar set of welds are used to attach the opposite side of platform 28 to mount 24 (not shown).

Referring back to FIG. 1, the remainder of laser subassembly 20 and fiber subassembly 22 will be described. Included in laser subassembly 20 is a first graded-index (GRIN) lens 32 positioned in front of lens 26 and used to focus the output from laser 12 to a small spot size. First GRIN lens 32 is held in a first retainer 34 which mates with the housing surrounding laser 12. A second GRIN lens 36 is positioned at the rear of laser 12, and is used to focus the output from the rear face of laser 12, where this light output is used to monitor the operation of laser 12. A second retainer 38 is used to hold GRIN lens 36 in place.

Referring to exemplary fiber subassembly 22, a ferrule 18 holds fiber 16 and is surrounded by a z-direction adjustment sleeve 40. Fiber ferrule 18 may be axially moved within sleeve 40 to achieve the optimum axial alignment. A complete description of the use of this arrangement to perform the axial alignment is described in our copending patent application Ser. No. 62,026, filed on even date with this application.

At the completion of the axial alignment procedure, the radial, or x,y-direction alignment of sleeve 40 to retainer 34 may proceed. In most cases, these two pieces may be formed to comprise the same, or nearly the same, outer diameter. This situation is necessary to achieve a reliable radial alignment. Although faces 44 and 42 of retainer 34 and sleeve 40, respectively, may be perfectly aligned in the x,y-direction at the completion of the axial alignment process, this is highly unlikely. Thus, some type of radial alignment will be required. In the prior art, a straightforward active alignment was utilized, involving the movement of pieces 38 and 40 in the x and y directions until the light output was optimized.

Figure 3:
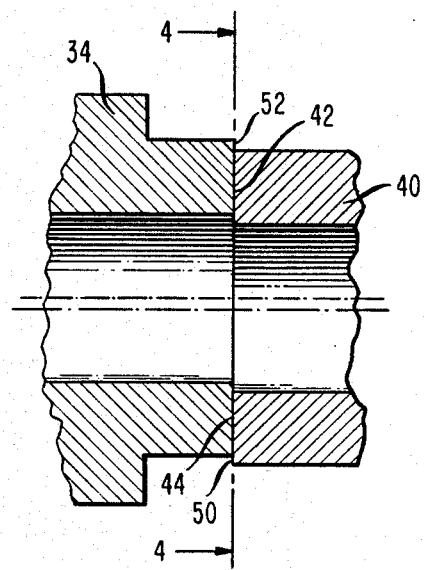
FIG. 3 illustrates a simplified model of the areas of the fiber subassembly and the optical subassembly which are joined during the radial alignment process of the invention.
Figure 4:
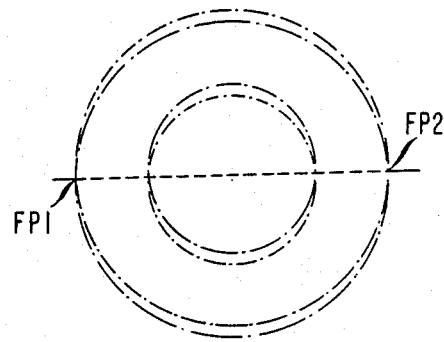
FIG. 4 contains a cross-section of the subassemblies taken along line 4—4 of FIG. 3.

An improved x,y alignment process has been developed for use with this laser package, and can in general be used to provide the x,y alignment of any two cylindrical pieces having similar outer diameters. FIG. 3 illustrates, in a side view, the portions of retainer 38 and sleeve 40 which are to be radially aligned. The offset between the pieces at the end of the z-lock process is shown illustratively as points 50 and 52 in FIG. 3. FIG. 4 is a view taken along line 4—4 of FIG. 3 and clearly shows the pair of flush points FP1 and FP2 associated with the mating of retainer 38 and sleeve 40. The x,y alignment process of the present invention, as stated above, is initiated by welding the pieces together at these flush points. We have discovered that by welding the flush points first and applying the remaining welds symmetrically about these flush points, the motion between retainer 38 and sleeve 40 can be controlled. During this welding procedure, the output through fiber 16 is continuously monitored. Based upon any changes in this output during the welding operation, the process of the present invention will prioritize the weld location about the more favorable flush point. This prioritization of weld location is an important feature of the inventive process.

Figure 5:
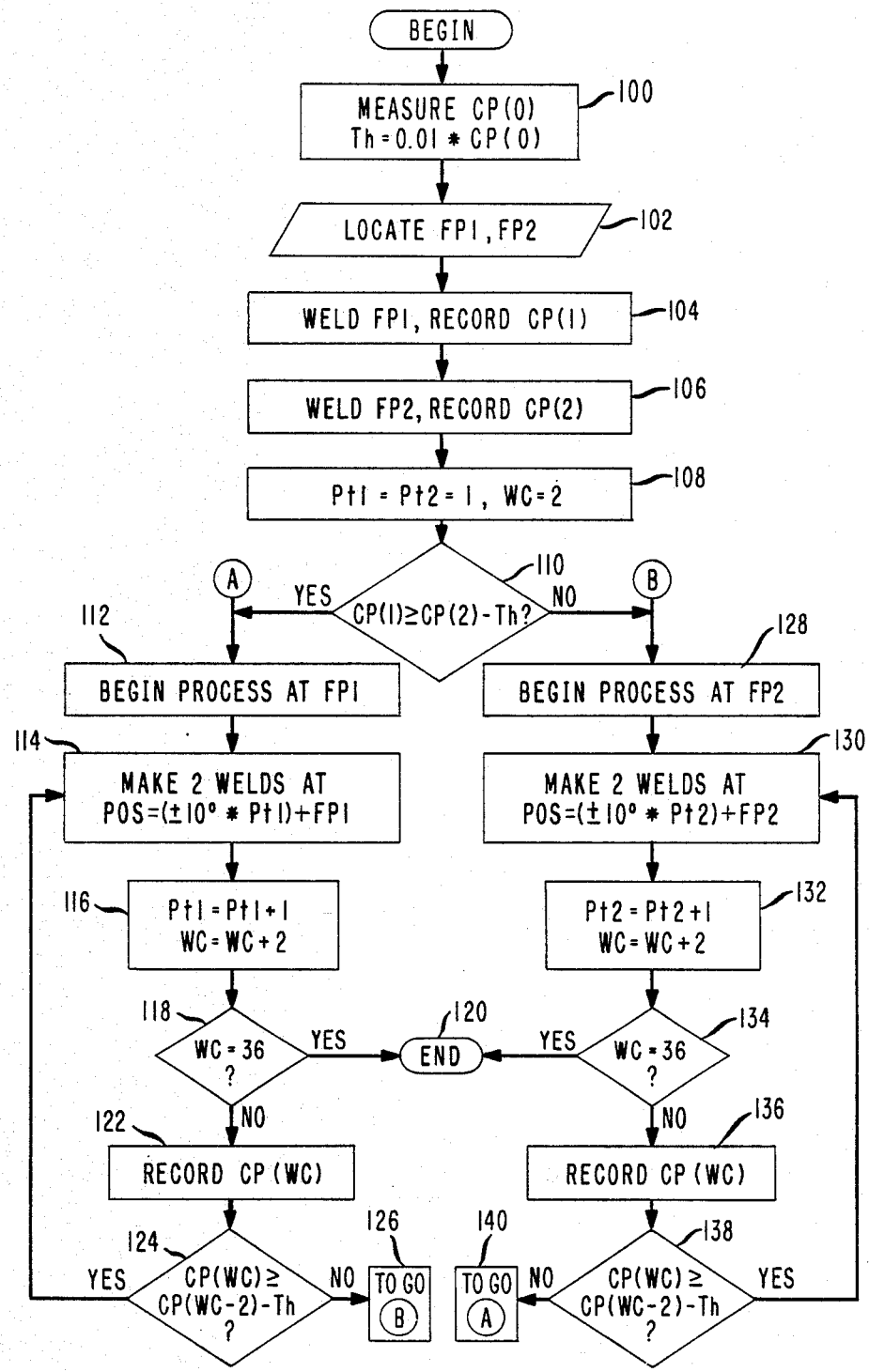
FIG. 5 is a flowchart detailing the radial alignment process of the invention.

As mentioned above, an advantage of the inventive radial alignment and attachment process is that it may be automated. FIG. 5 is a flowchart which illustrates in detail the radial attachment process of the present invention, where this flowchart may serve as the basis for an automated alignment operation. As shown, the process begins at step 100 by measuring the initial coupling power between retainer 34 and sleeve 40 (any other measure of throughput efficiency may also be employed) and noting such as CP(0). A portion of this power, referred to as a threshold value Th, is then determined by the relation $$Th = 0.01 * CP(0). \tag{1}$$

The purpose of threshold value Th will be discussed later in association with a subsequent step in the process. Proceeding along the flowchart, step 102 relates to identifying the two flush points, designated FP1 and FP2. At step 104, a laser weld is performed at FP1 and the coupling power (or any other measure of throughput efficiency) is recorded and noted as CP(1). A laser weld is then performed at FP2 and the coupling power recorded as CP(2), as noted at step 106. Proceeding along to step 108, a number of initialization operations are next performed. In particular, a pointer associated with FP1, designated Pt1, and a pointer associated with FP2, designated Pt2, are initialized at a "1" value. A weld counter WC is initialized at a value of 2, referring to the pair of weld which have already been performed at FP1 and FP2 during steps 104 and 106, respectively.

In association with the prioritizing feature of the inventive process, decision step 110 compares the value of CP(1) with the quantity CP(2)-Th. Threshold value Th, determined in this example to be 1% of the initial coupling power, is substracted from CP(2) to compensate for the nominal fluctuations in laser output. It is to be understood that value other than 1%, for example, 0.5% or 2%, may be used in equation (1) to determine the appropriate threshold value. Returning to decision step 110, as long as CP(1) is greater than or equal to the quantity CP(2)-Th, the welding process will continue at FP1. On the other hand, if CP(1) is less than this quantity, the welding process will proceed at FP2. In general, the welding process will continue around the flush point where the coupling is greater.

Assuming that the value of CP(1) is greater, the process will continue down the left-hand branch of the flowchart, designated with the letter A, beginning the welding sequence at FP1, as noted by step 112. In particular, a pair of welds are then made at positions on either side of FP1, as indicated by step 114. The relative distance between these weld sites (POS) being defined by separation in degrees. For example, a series of welds 10 degrees apart may be made around the complete circumferential seam between retainer 34 and sleeve 40. Thus, a total WC of 36 will be required to complete the operation. Referring to step 114, it is seen that the weld site positions are determined by the relation $$POS = (\pm 10 * Pt1) + FP1, \qquad (2)$$

where FP1 is measured in degrees. Therefore, since the pointer Pt1 has been initialized to a value of "1" in step 108, the first two welds will be made at positions $\pm 10°$ from FP1. For example, if FP1 is located at 45°, the two welds will be made at 55° and 35°. It is to be understood that in the alternative, a series of welds 5 degrees apart may be used, for a WC total of 72. The total number of welds is merely a matter of choice and convenience to the user. For the purposes of the present discussion, it will be assumed that a total of 36 welds, 10 degrees apart, are being used.

After the first pair of welds is completed, the various counters are incremented in step 116. In particular, pointer Pt1 is incremented by the value "1" so that the position of the next set of welds will be located 20° from FP1, as derived from equation (2). The weld counter WC is incremented by the value "2", since two more welds have been completed. The process is then checked by decision step 118 to ascertain if all of the welds have been made. If weld counter WC were equal to 36, the process would end, as indicated by step 120. At this moment, the WC in our example has a value of "4", so the process continues to step 122, which measures the present coupling power of the arrangement, denoted as CP(WC). As described above, the coupling power is measured at the end of each welding operation of check for any drop in coupling power. As shown in decision step 124, the current value of CP(WC) is compared to the quantity PC(WC-2)-Th. As long as the current coupling power is at least equal to the previously recorded value minus the fluctuation threshold, the process will loop back to step 114 and continue to make pairs of welds, following the steps outlined above.

Referring back to decision step 124, if the current value of CP(WC) drops below the defined quantity, the welding operation is rotated to the remaining flush point FP2 in order to minimize any movement between the parts during this radial alignment and attachment process. This movement to prioritize welding locations is vital to the practice of the method of the invention. This movement is indicated in the flowchart at step 126, which redirects the welding operation to branch B, associated with the welding operation at FP2. The welding operation at this flush point is identified at step 128. The first pair of welds around FP2 is then made at step 130, where the positions of these welds is determined in the same manner as associated with step 114, using the same equation (2), substituting Pt2 for Pt1 and FP2 for FP1. The counters are then incremented at step 132 and the total weld count WC, which keeps a running sum regardless of which branch in the flowchart is being followed, is then evaluated at decision step 134. Again, if WC is equal to 36, the process ends at step 120. Otherwise, the process continues at step 136 by measuring the current coupling power CP(WC). The subsequent decision step 138 then compares this value to the quantity CP(WC-2)-Th. As long as the current value is at least equal to this quantity, the welding process will loop back to step 130 and continue to perform welds around flush point FP2. Once the output drops, the process, as controlled by decision step 138, movest to step 140, which redirects the welding operation back to FP1. It is obvious that, in accordance with the prioritization aspect of the inventive method, the welding operation may rotate any number of times between FP1 and FP2 to maintain the optimum coupling efficiency between retainer 38 and sleeve 40. Alternatively, if the coupling efficiency is nearly optimum to begin with, the entire welding operation may be accomplished by applying symmetric welds about only one flush point.

FIG. 6 is a chart of the values associated with an exemplary radial alignment and attachment operation performed in accordance with the present invention. The left-hand column, denoted "Weld Sequence" records the incrementing values of counter WC. The next column specifies the actual location of the welds, measured in degrees. The related value of coupling power CP(WC) is listed in the right-hand column.

As noted above, prior to beginning the inventive radial alignment process, the coupling power is measured, denoted WC(0). The next two welds, numbered 1 and 2, are made at FP1 and FP2, respectively. Proceeding down the chart, the next three pairs of welds (WC 3-8) were made surrounding FP1 (175°) at locations $\pm 10°$, $\pm 20°$, and $\pm 30°$, respectively. The coupling power measured after the third pair of welds is seen to have dropped off significantly. Therefore, in accordance with our inventive method, the alignment and attachment operation shifted to FP2 (355°). In this example, four pairs of welds were made before the power dropped. The process then reverted to applying symmetric welds about FP1. As seen by reference to FIG. 6, the coupling power stabilized after aproximately two-thirds of the total number of welds had been made.

It is to be understood that minor variations in this process sequence are well within the scope of the present invention. As mentioned above, the actual number of welds performed is a matter of choice. Additionally, various steps within each loop of branches A and B may be interchanged without affecting the process. For example, step 122 related to measuring current coupling efficiency may be moved ahead of step 116 (counter incrementing step). In fact, the coupling may be measured after each separate weld is completed. Additionally, the coupling efficiency comparison decision step 124 may be moved ahead of the weld count decision step 118. However, this results in performing a computation which may be unnecessary if the total WC has already been attained. However, these and other modifications in the process sequence will have no affect on the over-all inventive process, related to the formation of symmetric welds about known flush points and the monitoring of coupling power to prioritize subsequent weld locations.

What is claimed is:

1. A method of achieving radial alignment and attachement between an optical device subassembly and an optical fiber subassembly, both subassemblies comprising essentially identical outer diameters, the method comprising the steps of:
    (a) determining the total number of attachments (WC) desired and dividing said total into 360 to determine the position increments to be used for locating each site;

(b) measuring and recording the initial throughput efficiency (CP(0)) between said optical device subassembly and said optical fiber subassembly and defining a certain percentage of said initial throughput efficiency as a threshold value (Th);

(c) locating a pair of flush point (FP1,FP2) where the edges of said subassemblies coincide;

(d) attaching said subassemblies at said pair of flush points;

(e) measuring and recording the throughput efficiency (CP(1), CP(2)) after each attachment performed in step (d);

(f) comparing the value of CP(1) to the quantity CP(2)-Th and proceeding to step (g) as long as CP(1) is at least equal to the quantity CP(2)-Th, otherwise, proceeding to step(j);

(g) attaching said subassemblies at a pair of symmetric attachment sites on either side of a first flush point (FP1) of said pair of flush points at loations determined by the position increment defined in step (a);

(h) measuring and recording the current throughput efficiency (CP(WC)) between said subassemblies;

(i) comparing the current throughput efficiency measured in step (h) with the last recorded throughput efficiency (CP(WC-2)) and returning to step (g) as long as said current efficiency CP(WC) is at least equal to said last recorded efficiency minus said threshold value (CP(WC-2)-Th), otherwise proceeding to step (j) as long as the total number of attachments (WC) as defined in step (a) have not been made, the alignment and attachment process being completed if the total number of attachments has been reached;

(j) attaching said subassemblies at a pair of symmetric locations on either side of a second flush point (FP2) of said pair of flush points, at locations determined by the position increment defined in step (a);

(k) measuring and recording the current throughput efficiency (CP(WC)) between said subassemblies;

(l) comparing the current throughput efficiency measured in step (k) with the last recorded throughput efficiency (CP(WC-2)) and returning to step (j) as long as said current throughput efficiency (CP(WC)) is at least equal to said last recorded efficiency minus said threshold value (CP(WC-2)-Th), otherwise returning to step (g) as long as the total number or attachments as defined in step (a) has not been made, the alignment and attachment process being completed if the total number of attachments has been reached.

2. The method of alignment and attachment as defined in claim 1 wherein in performing step (g), the following steps are completed:

(g1) initializing a pointer (Pt1) to a value of "1", and an attachment counter (WC) to the value of "2" unless the attachment counter has a current value greater than "2";

(g2) determining the positions of the pair of attachment sites by using the relation POS=($\pm$position increment * Pt1)+FP1;

(g3) incrementing the pointer by the value "1" (Pt1=Pt1+1) and the attachment counter by the value "2" (WC=WC+2);

(g4) returning to step (g2) for each subsequent attachment operation of step (g).

3. The method of alignment and attachment as defined in claim 2 wherein in performing step (g2), the position increment comprises a value of 10 degrees.

4. The method of alignment and attachment as defined in claim 1 wherein in performing step (j), the following steps are completed:

(j1) initializing a pointer (Pt2) to a value of "1", and an attachment counter (WC) to the value of "2" unless the attachment counter has a current value greater than "2";

(j2) determining the positions of the pair of attachment sites by using the relation POS=($\pm$position increment * Pt2)+FP2;

(j3) incrementing the pointer by the value "1" (Pt2=Pt2+1) and the attachment counter by the value "2" (WC=WC+2);

(j4) returning to step (j2) for each subsequent attachment operation of step (j).

5. The method of alignment and attachment as defined in claim 4, wherein in performing step (j2), the position increment comprises a value of 10 degrees.

6. The method of alignment and attachment as defined in claim 1, wherein in performing steps (g) and (j), the following steps are completed:

(g1) initializing a pointer (Pt1) to a value of "1", and an attachment counter (WC) to the value of "2" unless the attachment counter has a current value greater than "2";

(g2) determining the positions of the pair of attachment sites by using the relation POS=($\pm$position increment * Pt1)+FP1;

(g3) incrementing the pointer by the value "1" (Pt1=Pt1+1) and the attachment counter by the value "2" (WC=WC+2);

(g4) returning to step (g2) for each subsequent attachment operation of step (g);

(j1) initializing a pointer (Pt2) to a value of "1", and an attachment counter (WC) to the value of "2" unless the attachment counter has a current value greater than "2";

(j2) determining the positions of the pair of attachment sites by using the relation POS=($\pm$position increment * Pt2)+FP2;

(j3) incrementing the pointer by the value "1" (Pt2=Pt2+1) and the attachment counter by the value "2" (WC=WC+2);

(j4) returning to step (j2) for each subsequent attachment operation of step (j).

7. The method of alignment and attachment as defined in claim 6 wherein in performing steps (g2) and (j2), the position increment comprises a value of 10 degrees.

8. The method of alignment and attachment as defined in claim 1 wherein in performing steps (d), (g) and (j), laser welding is used to attach the pair of subassemblies.

9. The method of alignment and attachment as defined in claim 1 wherein in performing step (a), a total of 36 attachment sites are determined, with position increments of 10 degrees.

10. The method of alignment and attachment as defined in claim 1 wherein in performing steps (e), (h), and (k), the coupling power between the pair of subassemblies is measured to determine the throughput efficiency.

11. The method of alignment and attachment as defined in claim 10 wherein in performing step (b), ten percent of the coupling power is used to define the threshold value.

* * * * *